United States Patent
Chiu

(10) Patent No.: US 7,751,097 B2
(45) Date of Patent: *Jul. 6, 2010

(54) METHODS AND APPARATUSES FOR CHANGING DRIVING SEQUENCE TO OUTPUT CHARGE COUPLED DEVICE SIGNAL

(76) Inventor: Chui-Kuei Chiu, No. 215 Heng-Shan St., Heng-Shan Tsun, Heng-Shan Hsiang, Hsinchu Hsien (TW)

(*) Notice: Subject to any disclaimer, the term of this patent is extended or adjusted under 35 U.S.C. 154(b) by 150 days.

This patent is subject to a terminal disclaimer.

(21) Appl. No.: 12/013,318

(22) Filed: Jan. 11, 2008

(65) Prior Publication Data

US 2008/0174840 A1    Jul. 24, 2008

Related U.S. Application Data

(63) Continuation of application No. 09/940,829, filed on Aug. 27, 2001, now Pat. No. 7,385,734.

(51) Int. Cl.
*H04N 1/04* (2006.01)
*H04N 1/40* (2006.01)

(52) U.S. Cl. .................. 358/483; 358/482; 358/445; 358/512; 358/513; 358/514

(58) Field of Classification Search ................. 358/483, 358/482, 445, 512–514, 443, 409, 442; 250/208.1, 250/216, 214.1; 348/320–324, 237, 260, 348/266, 250; 257/291–293
See application file for complete search history.

(56) References Cited

U.S. PATENT DOCUMENTS

| 6,407,418 | B1 * | 6/2002 | Haga et al. ................. 257/294 |
| 6,473,538 | B2 * | 10/2002 | Kozuka ....................... 382/312 |
| 6,583,456 | B2 * | 6/2003 | Haga et al. ................. 257/292 |
| 6,954,232 | B2 * | 10/2005 | Chen ........................... 348/324 |

* cited by examiner

*Primary Examiner*—Cheukfan Lee
(74) *Attorney, Agent, or Firm*—Stolowitz Ford Cowger LLP

(57) ABSTRACT

A method of changing driving sequence to output a charge coupled device signal, the method is applied to a scanner. The scanner has a pixel processor and a charge coupled device. A plurality of charge signals detected by the charge coupled device is sequentially output to the pixel processor according to the driving sequence. In the method of changing the driving sequence to output the charge coupled device signal, a fast driving sequence is provided. The fast driving sequence has a period equal to 1/N of the original driving sequence. According to the fast driving sequence, the charge signal is sent to the pixel processing circuit. The charge signals are sampled by the processing circuit according to a sampling sequence, and the data obtained by sampling is output.

22 Claims, 7 Drawing Sheets

METHODS AND APPARATUSES FOR CHANGING DRIVING SEQUENCE TO OUTPUT CHARGE COUPLED DEVICE SIGNAL

BACKGROUND OF THE INVENTION

1. Field of the Invention

The invention relates in general to methods of scanning and outputting a charge coupled device signal, and more particularly, to a method of outputting a charge coupled device signal by changing the period of the driving sequence.

2. Description of the Related Art

In a normal color scanner, a color charge coupled device (CCD) is used as an optical sense device. The color charge coupled device is formed of several sensor cells to sense the intensities of the red (R), green (G) and blue (B) primary color lights. FIG. 1A shows a linear charge coupled device. The first row of sensor cells 102 of the linear charge coupled device is used to detect the R light intensity. The second row of sensor cells 104 is to detect the green light intensity, and the third row of sensor cells 106 is used to detect the blue light intensity. After a period of exposure time, different amounts of charges are accumulated according to the light intensities detected by the sensor cells. A charge signal formed by the charges is sent to a register within the period of a dump sequence. FIG. 2A shows the sequence of conventional linear charge coupled device signals. When the dump sequence SH is high, the charge signals of the first row of sensor cells 102 are sent to the register 108. Meanwhile, the charge signals of the second row of sensor cells are sent to the register 110, and the charge signals of the third row of sensor cells 106 are sent to the register 112. According to FIG. 2A, in period T1 of driving signals $\phi 1$ and $\phi 2$ (using the rising edge of the signal as the data transmitting point), the register 108 sends the charge signal S1 to the pixel processing circuit 114. Similarly, in period T2, the charge signal S2 is sent to the pixel processing circuit 114. The charge signals in the register 108 are thus sequentially sent to the pixel processing circuit 114. During a pixel sampling sequence, the pixel processing circuit sends the charge signal S1 to a subsequent circuit at the period TS1, and sends the charge signal S2 to a subsequent circuit at the period TS2. Thereafter, the charge signals are sequentially output to the subsequent circuit. The registers 110, 112, and the pixel processing circuits 116 and 118 are similar to the above description.

In FIG. 1B, the stagger charge coupled device has six rows of sensor cells 122, 124, 126, 128, 130 and 132. The first and second rows of sensor cells 122 and 124 are to detect the red light intensities. The third and fourth rows of sensor cells 126 and 128 are to detect the green light intensities. The fifth and sixth rows of sensor cells 130 and 132 are to detect the blue light intensities. After a certain exposure time, different amounts of charges are accumulated according to the light intensities detected by the sensor cells 122 to 132. FIG. 2B shows the sequence of the stagger charge coupled device signals. When the dump sequence SH is high, the charge signals of the first, second, third, fourth, fifth and sixth rows of sensor cells 122 to 132 are sent to the registers 134, 136, 138, 140, 142 and 144, respectively. In the period T11 of the driving sequences 41 and 42, the register 134 sends the charge signal S1 to the pixel processing circuit 146. The charge signal S3 is sent to the pixel processing circuit 146 in the period T12. The register 136 sends the charge signal S2 to the pixel processing circuit 146 in the period T21 of the driving sequences $\phi 1$ and $\phi 2$. The charge signal S4 is sent to the pixel processing circuit 146 in the period T22. Thereafter, the charge signals of the register 134 are sequentially sent to the pixel processing circuit 146. During the pixel sampling sequence, the pixel processing circuit 146 outputs the charge signals S1 and S2 to the subsequent circuit at the period TS1 and TS2, respectively. The registers 126, 128, 130, 132 and the pixel processing circuits 148 and 150 are similar to the above.

FIG. 3 shows a block diagram of a scanner. In FIG. 3, the sensor 302 converts the charge signal detected by the charge coupled device into an analog voltage signal. Using an analog/digital converter 304, the analog voltage signal output from the sensor 302 is converted into a digital voltage signal. An application specified integrated circuit 306 and a compensation RAM 310 perform a calculation on the compensation value and the digital voltage signal. The calculated video signal is stored into a video RAM 308. The data of the image signal is then read from the video RAM 308 by the application specified integrated circuit 306, and sent to the I/O port 312.

When the scanner is scanning a video document, a high resolution is not always required. Without changing the scanner structure (that is, the amount of the sensor cells in each row of the charge coupled device), the sampling sequence of the analog/digital converter is changed. That is, the scanning optical resolution is reduced to one half, and the sampling sequence of the analog/digital converter is reduced to one half. Or alternatively, the scanning optical resolution is reduced to one quarter, and the sampling sequence of the analog/digital converter is reduced to one quarter. When the optical resolution of the scanner is reduced, and the sampling time of the analog/digital converter is not reduced, the scanning time of the scanner is not reduced, that is, the scanner does not have the function of high scanning speed at low optical resolution.

SUMMARY OF THE INVENTION

The invention provides a method of changing a driving sequence to output a charge coupled device applied to a scanner. The scanner has a pixel processor and a charge coupled device. According to the driving sequence, a plurality of charge signals detected by the charge coupled device is output to the pixel processor sequentially. The pixel processor then sequentially outputs the charge signals according to a sampling sequence. The method of changing the driving sequence to output the charge coupled device signal includes the following steps. A fast driving sequence is provided. The period of the fast driving sequence is 1/N of the period of the original driving sequence. During the fast driving sequence, the charge signal is sent to the pixel processor. The charge signal is then sampled at the pixel processor according to the sampling sequence. The data obtained by sampling is output, such that the scanner possesses the high scanning speed function at a low optical resolution.

Both the foregoing general description and the following detailed description are exemplary and explanatory only and are not restrictive of the invention, as claimed.

DESCRIPTION OF THE PREFERRED EMBODIMENTS

Figure 1A:
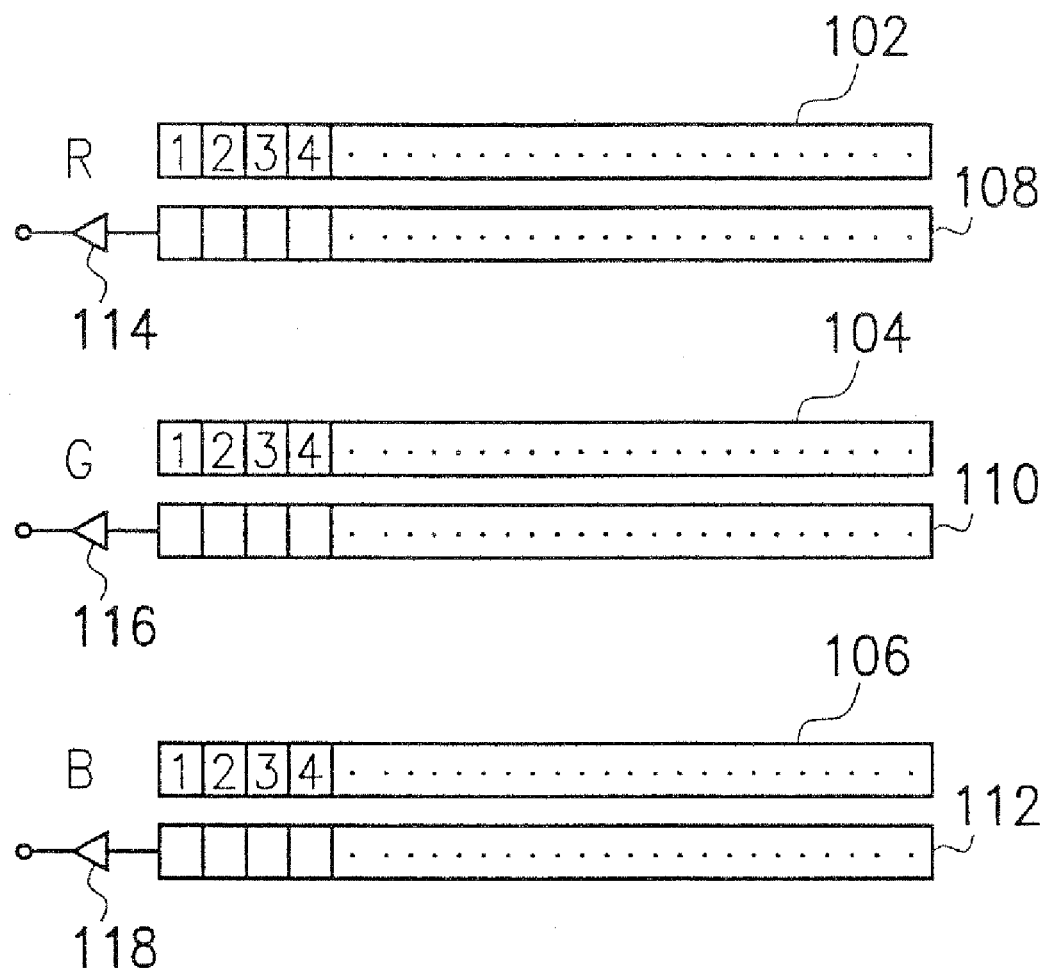
FIG. 1A shows a linear charge coupled device.
Figure 1B:
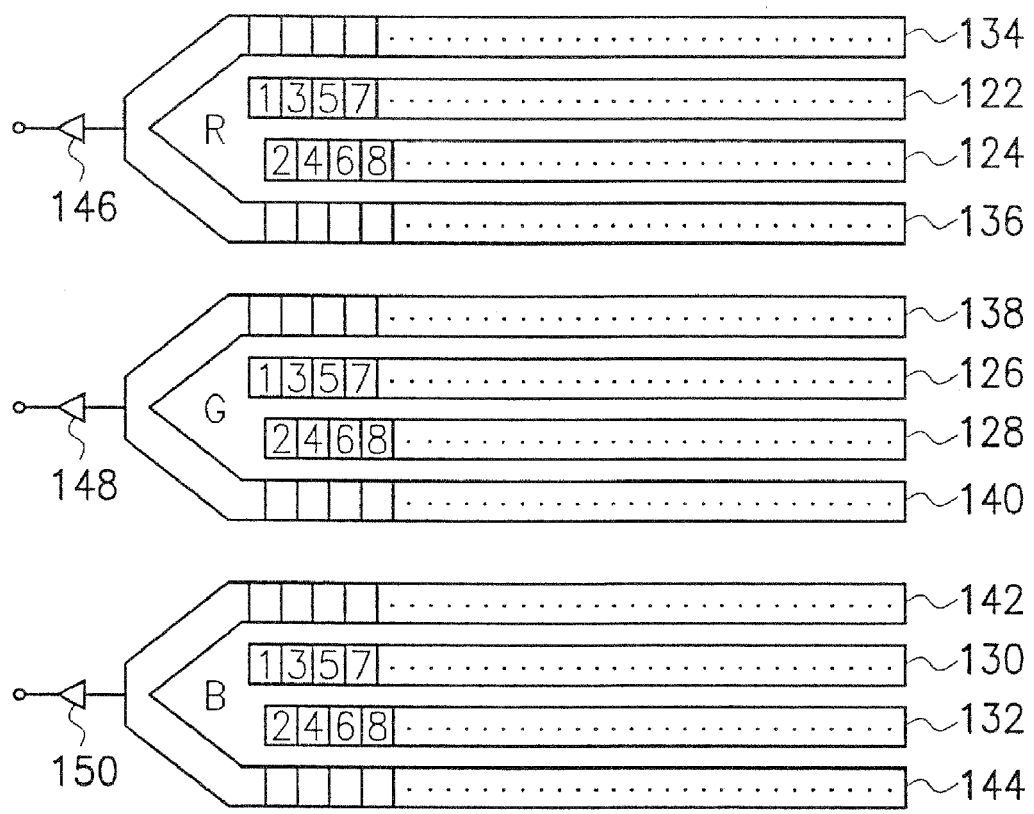
FIG. 1B shows a stagger charge coupled device
Figure 2A:
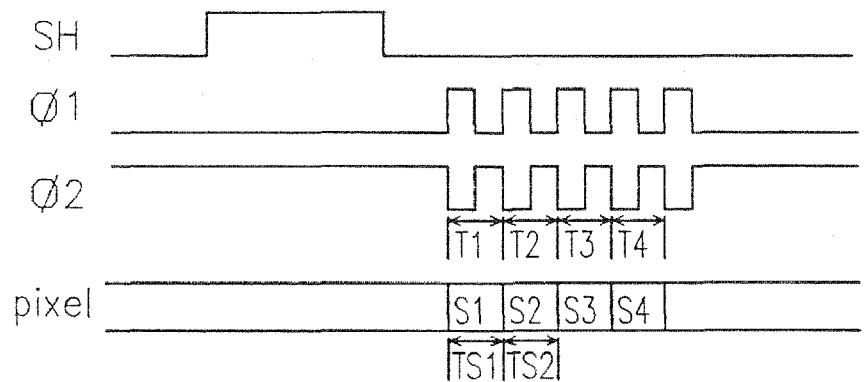
FIG. 2A shows the sequence of the conventional linear charge coupled device signal.
Figure 2B:
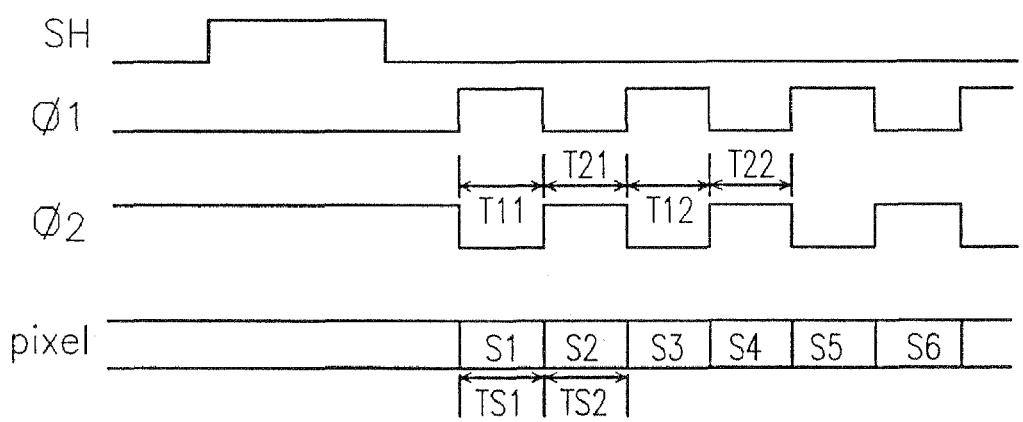
FIG. 2B shows the sequence of the conventional stagger charge device signal.
Figure 3:
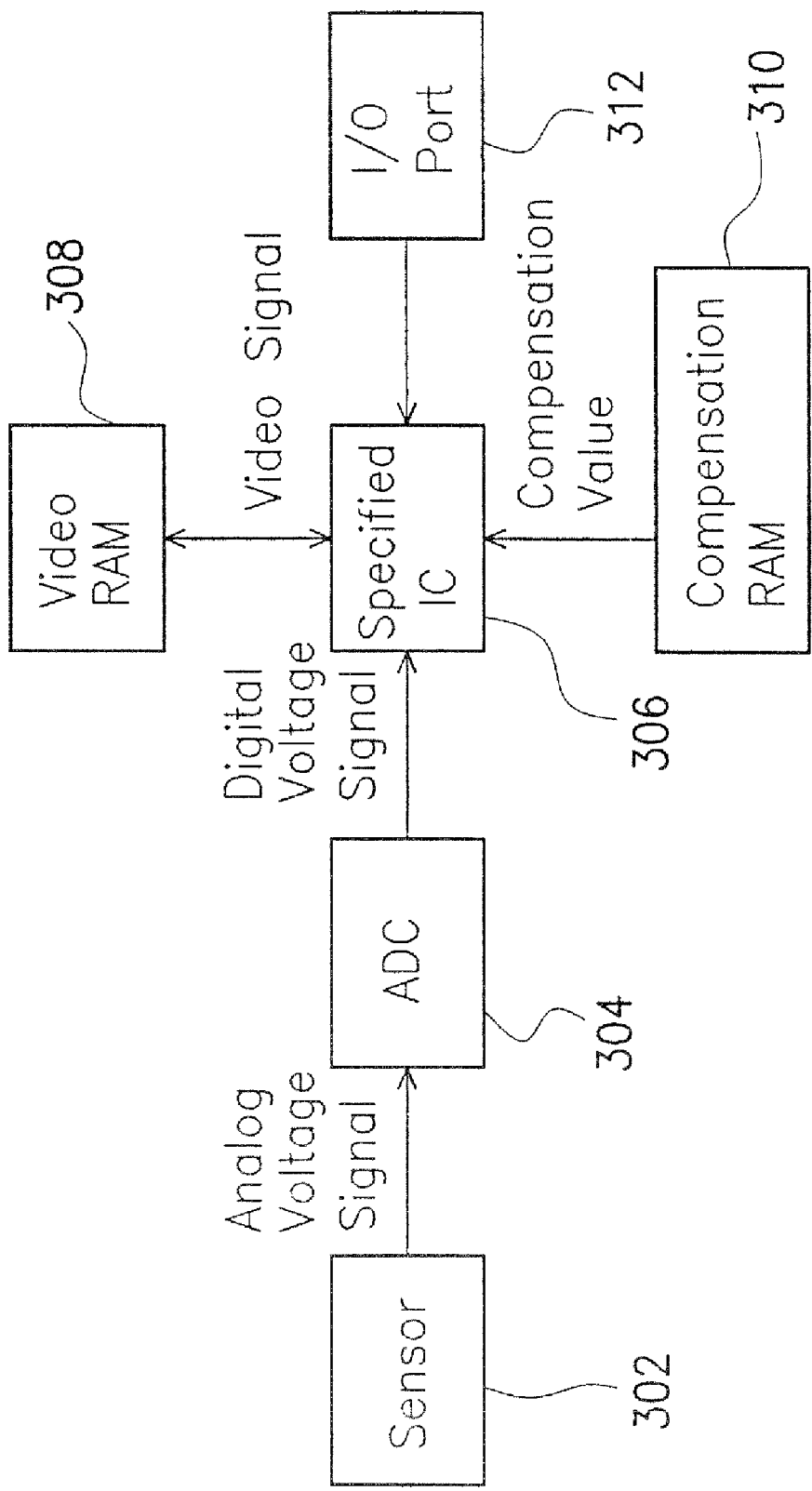
FIG. 3 is a block diagram of a scanner.
Figure 4A:
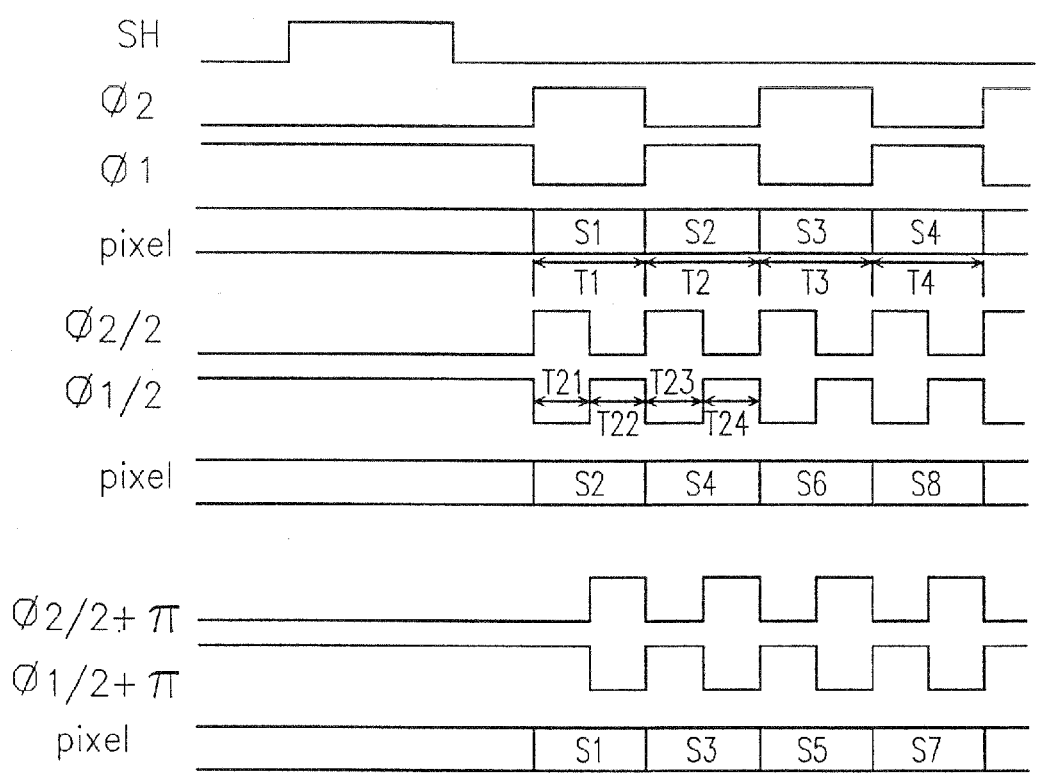
FIG. 4A shows that the period of the driving sequence becomes one half of the original value.

In this embodiment, a stagger charge coupled device is used as an example (the linear charge coupled device has different number of rows of sensor cells), of which the structure is illustrated as FIG. 2B. At the descending edge of the driving sequence, the register sends the charge signal to the video processor. After exposing the stagger charge coupled device within a period of time, different amounts of charges are accumulated according to the light intensity detected by the sensor cells. The charge signals formed by the charges are all sent to the register within a period of a dump sequence. In FIG. 4A, the period of the driving sequence is reduced to one half. When the dump sequence SH is high, the first row of sensor cells 122 outputs the charge signal to the register 134. The charge signals of the second row of the sensor cells 124 are sent to the register 136. Within the period T1 of the driving sequences φ1, φ2, the charge signal S1 is sent to the pixel processor 146, which then outputs the charge signal S1 to a subsequent circuit within the period T1 of the pixel sampling sequence. The register 134 sends the charge signal to the pixel processor 146 within the period T3 of the register 134. The pixel processor 146 outputs the charge signal S3 to the subsequent circuit within the period T3 of the pixel sampling sequence. The register 136 sends the charge signal S2 to the pixel processor 146 within the period T2 of the driving sequence φ1, φ2. The pixel processor 146 outputs the charge signal S2 to the subsequent circuit within the period T2 of the pixel sampling sequence. The register 136 sends the charge signal S4 to the pixel processor 146 within the period T4 of the driving sequence φ1, φ2. The pixel processor 146 outputs the charge signal S4 to the subsequent circuit within the period T4 of the pixel sampling sequence. The subsequent sequence operation is similar.

When only one half of the optical resolution is required, the period of the driving sequence is one half of the original one. In FIG. 4A, the register 134 sends the charge signal S1 to the pixel processor 146 within the period T21 of the driving sequence φ1/2, φ2/2. The register 136 sends the charge signal S2 to the pixel processor 146 within the period T22 of the driving sequence φ1/2, φ2/2. The pixel processor 146 outputs the charge signal S2 to the subsequent circuit within the period T1 of the pixel sampling sequence. The register 134 sends the charge signal S3 to the pixel processor 146 within the period T23 of the driving sequence φ1/2, φ2/2. The register 136 sends the charge signal S4 to the pixel processor 146 within the period T24 of the driving sequence φ1/2, φ2/2. The pixel processor 146 outputs the charge signal S4 to the subsequent circuit within the period T2 of the pixel sampling sequence. Thus, the charge signal of the even number of rows of sensor cells can be output to the subsequent circuit, so that the optical resolution of the scanner is reduced to a half.

If the charge signals of the odd number of row of sensor cells are sent to the subsequent circuit, the driving sequence φ1/2, φ2/2 is shifted by 180°. In FIG. 4A, the register 134 sends the charge signal S1 to the pixel processor 146 within the period T22 of the driving sequence φ1/2+π, φ2/2+π. The pixel processor 146 then outputs the charge signal S1 to the subsequent circuit within the period T1 of the pixel sampling sequence. The register 136 sends the charge signal S2 to the pixel processor 146 within the period T23 of the driving sequence φ1/2+π, φ2/2+π. The register 134 sends the charge signal S3 to the pixel processor 146 within the period T24 of the driving sequence φ1/2+π, φ2/2+π. The pixel processor 146 then outputs the charge signal S3 to the subsequent circuit within the period T2 of the pixel sampling sequence. The operation of the subsequent sequences is similar.

Figure 4B:
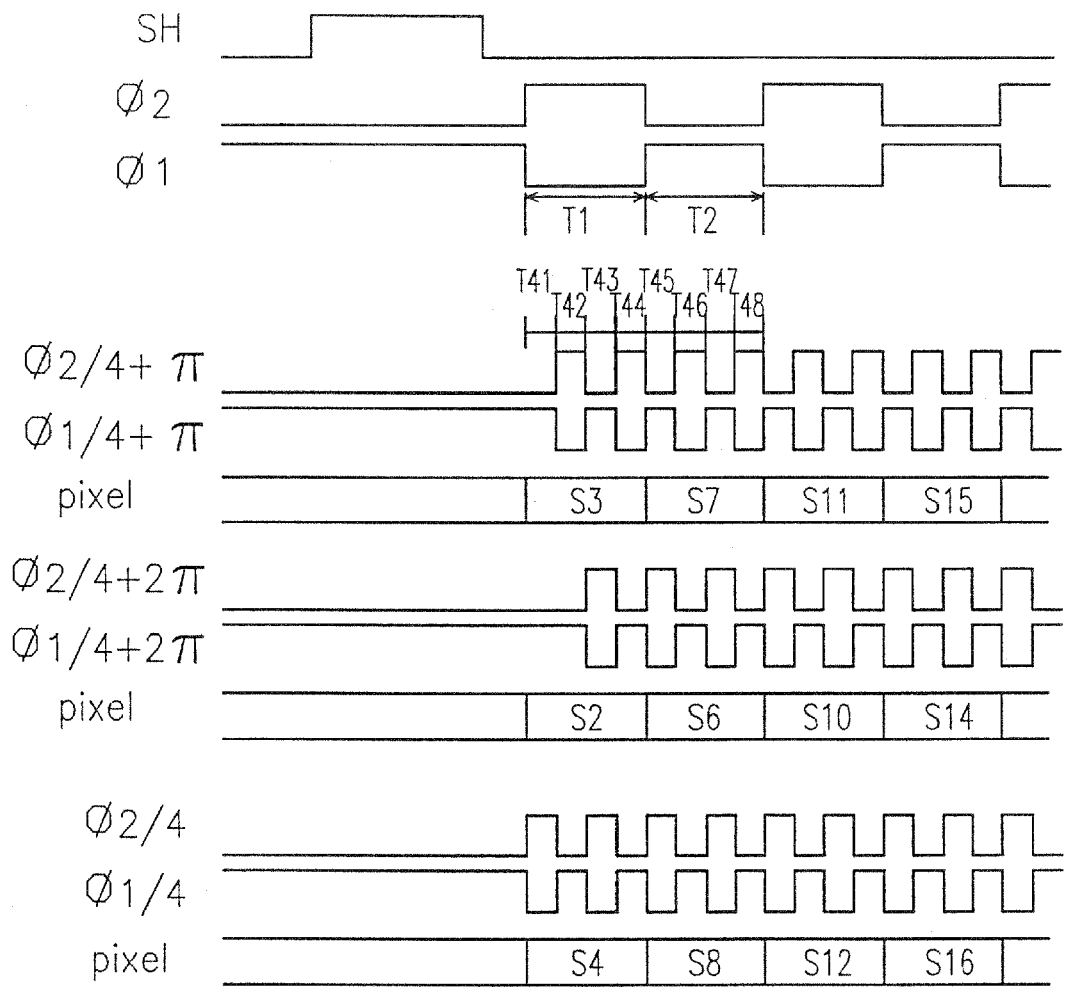
FIG. 4B shows that the period of the driving sequence becomes one fourth of the original value.

When only one fourth of the optical resolution of the scanner is required, that is, when the period of the driving sequence becomes one fourth of the original one as shown in FIG. 4B, the register 134 sends the charge signal S1 to the pixel processor 146 within the period T41 of the driving sequence φ1/4, φ2/4. Meanwhile, the register 136 sends the charge signal S2 to the pixel processor 146 within the period T42 of the driving sequence φ1/4, φ2/4. The register 134 sends the charge signal S3 to the pixel processor 146 within the period T43 of the driving sequence φ1/4, φ2/4. The register 136 sends the charge signal S4 to the pixel processor 146 within the period T44 of the driving sequence φ1/4, φ2/4. The pixel processor 146 then outputs the charge signal S4 to the subsequent circuit within the period T1 of the pixel sampling sequence. The register 134 sends the charge signal S5 to the pixel processor 146 within the period T45 of the driving sequence φ1/4, φ2/4. The register 136 sends the charge signal S6 to the pixel processor 146 within the period T46 of the driving sequence φ1/4, φ2/4. The register 134 sends the charge signal S7 to the pixel processor 146 within the period T47 of the driving sequence φ1/4, φ2/4. The register 136 sends the charge signal S8 to the pixel processor 146 within the period T48 of the driving sequence φ1/4, φ2/4. The pixel processor 146 then outputs the charge signal S8 to the subsequent circuit within the period T2 of the pixel sampling sequence. Thus, the charge signals of every other four of the sensor cells is output to the subsequent circuit to reduce the optical resolution of the scanner into one fourth.

If the third sensor cell is the initial position to output, and the charge signal of every other four sensor cells is sent to the subsequent circuit, the driving sequence is shifted by 180°. In FIG. 4B, the register 134 sends the charge signal S1 to the pixel processor 146 within the period T42 of the driving sequence φ1/4+, φ2/4+. The register 136 sends the charge signal S2 to the pixel processor 146 within the period T43 of the driving sequence φ1/4+, φ2/4+. The register 134 sends the charge signal S3 to the pixel processor 146 within the period T44 of the driving sequence φ1/4+, φ2/4+. The pixel processor 146 then outputs the charge signal S3 to the subsequent circuit within the period T1 of the pixel sampling sequence. The register 136 sends the charge signal S4 to the pixel processor 146 within the period T45 of the driving sequence φ1/4+, φ2/4+. The register 134 sends the charge signal S5 to the pixel processor 146 within the period T46 of the driving sequence φ1/4+, φ2/4+. The register 136 sends the charge signal S6 to the pixel processor 146 within the period T47 of the driving sequence φ1/4+, φ2/4+. The register 134 sends the charge signal S7 to the pixel processor 146 within the period T48 of the driving sequence φ1/4+, φ2/4+. The pixel processor 146 then outputs the charge signal S7 to the subsequent circuit within the period T2 of the pixel sampling sequence. Thereby, the third sensor cell is the output initial position and the charge signal of every other four sensor cells is output to the subsequent circuit.

If the second sensor cell is the initial position for output, and the charge signal of every other four sensor cells is sent to the subsequent circuit, the driving sequence φ1/4, φ2/4 is shifted by 360°. In FIG. 4B, the register 134 sends the charge signal S1 to the pixel processor 146 within the period T43 of the driving sequence φ1/4+2, φ2/4+2. The register 136 sends the charge signal S2 to the pixel processor 146 within the period T44 of the driving sequence φ1/4+2, φ2/4+2. The pixel processor 146 then outputs the charge signal S2 to the subsequent circuit within the period T1 of the pixel sampling sequence. The register 134 sends the charge signal S3 to the pixel processor 146 within the period T45 of the driving sequence φ1/4+2, φ2/4+2. The register 136 sends the charge signal S4 to the pixel processor 146 within the period T46 of the driving sequence φ1/4+2, φ2/4+2. The register 134 sends the charge signal S5 to the pixel processor 146 within the period T47 of the driving sequence φ1/4+2, φ2/4+2. The register 136 sends the charge signal S6 to the pixel processor 146 within the period T48 of the driving sequence φ1/4+2, φ2/4+2. The pixel processor 146 then outputs the charge signal S6 to the subsequent circuit within the period T2 of the pixel sampling sequence. Thereby, the second sensor cell is the output initial position and the charge signal of every other four sensor cells is output to the subsequent circuit.

Figure 4C:
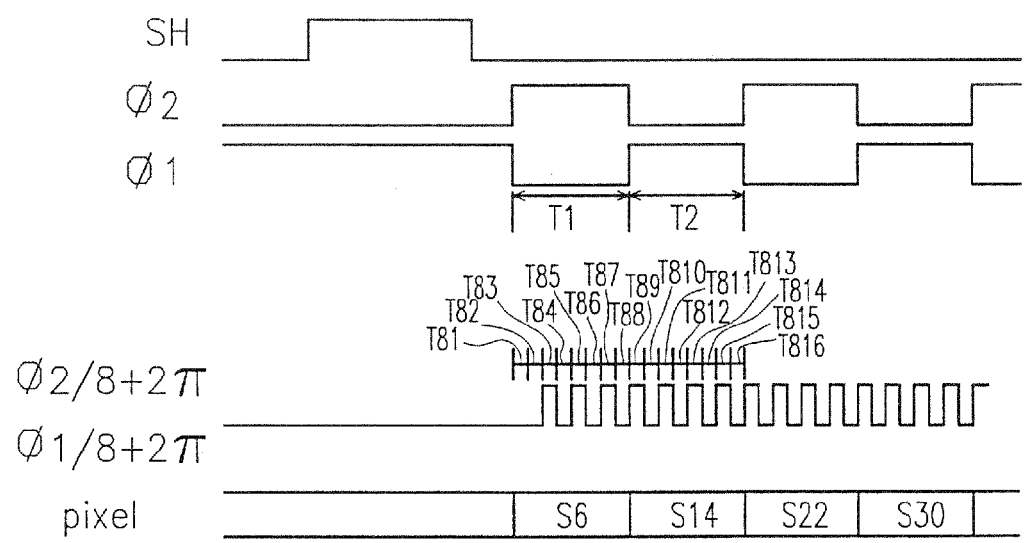
FIG. 4C shows that the period of the driving sequence becomes one eighth of the original value.

When the scanner requires only one eighth of the optical resolution, the period of the driving sequence becomes on eighth. FIG. 4C shows the sequence with a period one eighth of the original one. In FIG. 4C, the sixth sensor cell is used as the initial position, and the charge signal of every other eight sensor cells is output to the subsequent circuit. The driving sequence φ1/8, φ2/8 is shifted by 360°.

The register 134 sends the charge signal S1 to the pixel processor 146 within the period T83 of the driving sequence φ1/8+2π, φ2/8+2π. The register 136 sends the charge signal S2 to the pixel processor 146 within the period T84 of the driving sequence φ1/8+2π, φ2/8+2π. The register 134 sends the charge signal S3 to the pixel processor 146 within the period T85 of the driving sequence φ1/8+2π, φ2/8+2π. The register 136 sends the charge signal S4 to the pixel processor 146 within the period T86 of the driving sequence φ1/8+2π, φ2/8+2π. The register 134 sends the charge signal S5 to the pixel processor 146 within the period T87 of the driving sequence φ1/8+2π, φ2/8+2π. The register 136 sends the charge signal S6 to the pixel processor 146 within the period T88 of the driving sequence φ1/8+2π, φ2/8+2π. The pixel processor 146 then outputs the charge signal S6 to the subsequent circuit within the period T1 of the pixel sampling sequence. The register 134 sends the charge signal S7 to the pixel processor 146 within the period T89 of the driving sequence φ1/8+2π, φ2/8+2π. The register 136 sends the charge signal S8 to the pixel processor 146 within the period T810 of the driving sequence φ1/8+2π, φ2/8+2π. The register 134 sends the charge signal S9 to the pixel processor 146 within the period T811 of the driving sequence φ1/8+2π, φ2/8+2π. The register 136 sends the charge signal S10 to the pixel processor 146 within the period T812 of the driving sequence φ1/8+2π, φ2/8+2π. The register 134 sends the charge signal S11 to the pixel processor 146 within the period T813 of the driving sequence φ1/8+2π, φ2/8+2π. The register 136 sends the charge signal S12 to the pixel processor 146 within the period T814 of the driving sequence φ1/8+2π, φ2/8+2π. The register 134 sends the charge signal S13 to the pixel processor 146 within the period T815 of the driving sequence φ1/8+2π, φ2/8+2π. The register 136 sends the charge signal S14 to the pixel processor 146 within the period T816 of the driving sequence φ1/8+2π, φ2/8+2π. The pixel processor 146 then outputs the charge signal S146 to the subsequent circuit within the period T2 of the pixel sampling sequence. Thus, the sixth sensor cell is used as the initial position for output, and the charge signal of every other eight sensor cells is sent to the subsequent circuit. The optical resolution of the scanner is reduced to one eighth.

According to the above, by changing the period of the driving sequence of the charge coupled device, the optical resolution of the scanner can be changed. A phase shift can be performed to the period of the driving sequence to determine which sensor cell is the initial position to output the charge signal thereof to the subsequent circuit.

When the scanner is scanning a video document without the requirement of a high resolution, the period of the driving sequence of the charge signal output from the charge coupled device is changed without charging the structure of the scanner. For example, when the optical resolution is reduced to one half, the period of the driving sequence is reduced to one half. When the optical resolution is reduced to one fourth, the period of the driving sequence is reduced to one fourth. When the optical resolution is reduced, the sampling sequence of the analog/digital converter and the operation sequence of the application specific integrated circuit are not changed. Therefore, with the same amount of sampling and processing of data, the scanning speed is increased to output the charge signal by the same amount before reducing the optical resolution. The scanner can thus possess the function of high scanning speed at low optical resolution.

The advantage of the invention is to have the function of high scanning speed of the scanner even when the optical resolution is low.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

What is claimed is:

1. An apparatus, comprising:
   means for changing a period of a driving sequence;
   means for sending a plurality of charge signals to a pixel processor according to the driving sequence; and
   means for sampling the charge signals by the pixel processor according to a sampling sequence that remains fixed throughout the changing of the period of the driving sequence.

2. The apparatus of claim 1, wherein the period of the driving sequence can be changed to correspond with a selected operating resolution.

3. The apparatus of claim 1, wherein the sampling sequence operates according to a sampling period that remains constant for a plurality of different selectable operating resolutions.

4. The apparatus of claim 1, wherein different charge signals represent the intensity of different primary light colors.

5. The apparatus of claim 1, further comprising:
   means for selecting an operating resolution for a scan job, the operating resolution selectable from a plurality of different resolutions including a native resolution and at least one additional resolution that is less than the native resolution; and
   means for selecting the period for the driving sequence according to the operating resolution selection.

6. A system, comprising:
   image sensor circuitry configured to output a first signal based on a first driving sequence, wherein the first driving sequence can be changed; and
   pixel processor circuitry configured to receive the first signal, the pixel processor circuitry configured to generate a second signal based on a second driving sequence;

wherein the pixel processor circuitry is configured to continue to generate the second signal based on the second driving sequence regardless of whether the first driving sequence is changed.

7. The system of claim 6, wherein the image sensor circuitry includes a linear configuration of sensor cells.

8. The system of claim 6, further comprising:
input circuitry to select an operating resolution for a scan job, the operating resolution selectable from a plurality of different resolutions including a native resolution and at least one additional resolution that is less than the native resolution;
wherein a period of the first driving sequence is selected according to the selected operating resolution.

9. An apparatus, comprising:
a register configured to provide first signals representing an output of an image sensor, the register configured to transfer the first signals to a pixel processor according to a first time period that is selectable according to an operating resolution of the apparatus; and
a pixel processor configured to provide second signals based on at least a portion of the first signals, the pixel processor configured to transfer the second signals to a circuit according to a second time period.

10. The apparatus of claim 9, wherein the first time period is selectable within a range having a minimum value and a maximum value, wherein the maximum value of the range is equal to the second time period.

11. The apparatus of claim 9, wherein the first time period is selected by multiplying a base first time period by a ratio N.

12. The apparatus of claim 11, wherein the ratio N is determined by dividing the operating resolution by a base scanning resolution for the apparatus.

13. The apparatus of claim 9, wherein the second time period is fixed and the first time period is configurable according to the operating resolution.

14. The apparatus of claim 9, wherein the register outputs signals at a greater rate than the pixel processor if the operating resolution is set less than a base scanning resolution for the apparatus.

15. The apparatus of claim 14, wherein the register outputs the signals at the same rate as the pixel processor if the operating resolution is equal to the base scanning resolution.

16. The apparatus of claim 9, wherein the image sensor is a stagger charge coupled device.

17. The apparatus of claim 9, wherein the image sensor includes a plurality of rows of sensor cells for each of a plurality of colors.

18. A method of configuring a scanner device, the scanner device including a register to transfer first signals to a pixel processor that is configured to transfer second signals to a circuit, the method comprising:
configuring the scanner device to transfer the first signals at a first rate, the first rate being dynamically selected according to a selected operating resolution; and
configuring the scanner device to transfer the second signals at a second rate.

19. The method of claim 18, wherein the second rate is configured as a fixed rate.

20. The method of claim 19, wherein the dynamically selected first rate is equal to the fixed second rate if the selected operating resolution corresponds to a base resolution for the scanner device.

21. The method of claim 18, wherein the second rate is constant over different selected operating resolutions.

22. The method of claim 18, further comprising phase shifting a clock signal that controls the first rate, the phase shifting to alternate which sensor cell outputs are represented by the second signals.

* * * * *